United States Patent
Bergman et al.

(10) Patent No.: US 7,952,412 B2
(45) Date of Patent: May 31, 2011

(54) AUDIO DEVICE USING AC POWER CLOCK REFERENCE

(75) Inventors: John Bergman, River Falls, WI (US); Bryan Peterson, Balsam Lake, WI (US)

(73) Assignee: Cue Acoustics, Inc., Somerville, MA (US)

( * ) Notice: Subject to any disclaimer, the term of this patent is extended or adjusted under 35 U.S.C. 154(b) by 178 days.

(21) Appl. No.: 12/346,957

(22) Filed: Dec. 31, 2008

(65) Prior Publication Data

US 2009/0224810 A1    Sep. 10, 2009

Related U.S. Application Data

(60) Provisional application No. 61/019,076, filed on Jan. 4, 2008.

(51) Int. Cl.
*H03K 3/00* (2006.01)
(52) U.S. Cl. .................. 327/291; 361/814; 327/299
(58) Field of Classification Search .................. 327/291; 361/814
See application file for complete search history.

(56) References Cited

U.S. PATENT DOCUMENTS

| | | | |
|---|---|---|---|
| 4,583,865 | A | 4/1986 | Kirk et al. |
| 4,902,964 | A | 2/1990 | Szabela et al. |
| 5,424,514 | A * | 6/1995 | Lee ............................ 219/626 |
| 2003/0016003 | A1 | 1/2003 | Tsai |
| 2003/0184289 | A1 | 10/2003 | Butters et al. |
| 2006/0209637 | A1 | 9/2006 | May et al. |
| 2009/0225528 | A1 | 9/2009 | Bergman et al. |

FOREIGN PATENT DOCUMENTS

| | | |
|---|---|---|
| JP | 2001-196949 A | 7/2001 |
| JP | 2004-351968 A | 12/2004 |
| JP | 2007-166165 A | 6/2007 |
| JP | 2007-259250 A | 10/2007 |
| WO | 99-65135 A1 | 12/1999 |

OTHER PUBLICATIONS

Intersil, "Using 60Hz Power Line Frequency as an Accurate Real Time Clock Timebase", Aug. 3, 2007.

* cited by examiner

*Primary Examiner* — Lincoln Donovan
*Assistant Examiner* — John W Poos
(74) *Attorney, Agent, or Firm* — Lando & Anastasi, LLP

(57) ABSTRACT

A clock generating apparatus for use in an electronic device, such as a radio or other audio device, which generates a clock signal based on an AC input signal received, for example, from a wall outlet. The clock generating apparatus detects and monitors the frequency of the AC input signal and automatically adjusts the clock signal based on the detected frequency of the AC input signal.

20 Claims, 2 Drawing Sheets

AUDIO DEVICE USING AC POWER CLOCK REFERENCE

CROSS REFERENCE TO RELATED APPLICATIONS

This application claims priority under 35 U.S.C. §119(e) to U.S. Provisional Application No. 61/019,076 filed Jan. 4, 2008 and entitled "AUDIO DEVICE USING AC POWER CLOCK REFERENCE," which is incorporated herein by reference in its entirety.

BACKGROUND

1. Field of Invention

The present invention relates generally to generating clock signals for electronic devices and, more particularly, to methods and apparatus for generating a clock signal from an AC power signal.

2. Discussion of Related Art

In order to operate effective and accurately, electronics devices often require or make use of internal "clocks" or crystals which oscillate at a certain fixed frequency. In addition, some electronic devices, such as computers, clock radios, and the like, keep time in the form of a digital clock. These devices rely on a variety of methods to "check the clock" in order to verify that the clock is not running too quickly or too slowly. The clock checking mechanism may be internal (e.g., using circuitry, such as a crystal oscillator, within the device) or external (e.g., the device receives a clock signal from an external source).

Many electronics devices get their power from a wall outlet. Power utility companies are very careful to ensure that the power at the wall outlet oscillates at a very precise frequency, as any deviation in the frequency can disrupt the power grid. Accordingly, the power line, providing typically either a 50 Hz or 60 Hz input, may be used as a frequency reference for electronics devices to generate internal clocks. A 50 Hz AC input is common in Europe and Asia, while the 60 Hz AC input is common in America. The incoming AC signal is stepped down using a transformer and supplied to a real time clock (RTC) chip, such as that available from STMicroelectronics under part number M41T50. The stepped-down AC signal can also be rectified to provide a DC signal that is voltage-regulated and used to power the RTC chip. The RTC chip counts seconds, minutes, hours, days, etc. based on the received AC input to generate a real-time clock. In the case of the M41T50 chip, a configuration bit in the chip's register is used to select between a 50 Hz or 60 Hz input.

SUMMARY OF THE INVENTION

At least one embodiment described herein is directed to an electronic device incorporating a method and apparatus for supplying a reference clock signal from AC input power. According to one embodiment, an electronic device comprises a power input adapted to receive AC power having a power frequency, a signal input/output adapted to couple to an external device, a rectifier coupled to the power input and configured to rectify the AC power, and a controller coupled to the rectifier to receive an input synchronization signal having a synchronization frequency, the controller being configured to determine the power frequency based on the synchronization signal and to produce a clock signal derived from the power frequency. The controller may be configured to identify at least two different power frequencies. In one example, the controller is configured to determine the power frequency as 60 Hz based on a synchronization signal of 60 Hz and 120 Hz. In another example, the controller is configured to determine the power frequency as 50 Hz based on a synchronization signal of 50 Hz and 100 Hz.

According to one embodiment, an electronic device comprises a power input adapted to receive an AC power signal having a power frequency, clock generating apparatus including a rectifier coupled to the power input and configured to receive the AC power signal and to provide a rectified signal, and a synchronization detector configured to receive the rectified signal, to detect a frequency of the rectified signal and to generate a synchronization signal, and a controller coupled to the synchronization detector and configured to receive the synchronization signal, to automatically determine the power frequency based on the synchronization signal, and to control the clock generating apparatus to generate a clock signal derived from the power frequency.

In one example, the electronic device is an audio device. In another example, the audio device is a table-top radio. In one example of the electronic device, the power frequency is one of 50 Hz and 60 Hz. In another example, the electronic device further comprises a power supply configured to receive the AC power signal. In one example, the electronic device further comprises an isolation diode coupled between the rectifier and the power supply. The power supply may be, for example, a switching power supply. In another example of the electronic device, the synchronization detector comprises surge protection circuitry. According to another example, the power frequency is one of two values, and the synchronization detector is configured to automatically detect a correct one of the two values of the power frequency.

Another embodiment is directed to a method of automatically generating a clock signal from an AC power line. The method comprises acts of receiving an AC signal from the AC power line, automatically detecting a frequency of the AC signal, and generating the clock signal based on the detected frequency of the AC signal. In one example, the method further comprises rectifying the AC signal to generate a rectified signal having a frequency double the frequency of the AC signal. In another example, the act of automatically detecting the frequency of the AC signal includes automatically detecting the frequency of the AC signal based on the frequency of the rectified signal. In another example, the act of automatically detecting the frequency of the AC signal includes automatically detecting whether the frequency of the AC signal is 50 Hz or 60 Hz. According to another example, the method further comprises an act of monitoring the frequency of the AC signal to detect changes in the frequency of the AC signal. In another example, the method further comprises an act of automatically adjusting the clock signal responsive to detected changes in the frequency of the AC signal.

Still other aspects, embodiments, and advantages of these exemplary aspects and embodiments, are discussed in detail below. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DESCRIPTION OF THE INVENTION

Figure 1:
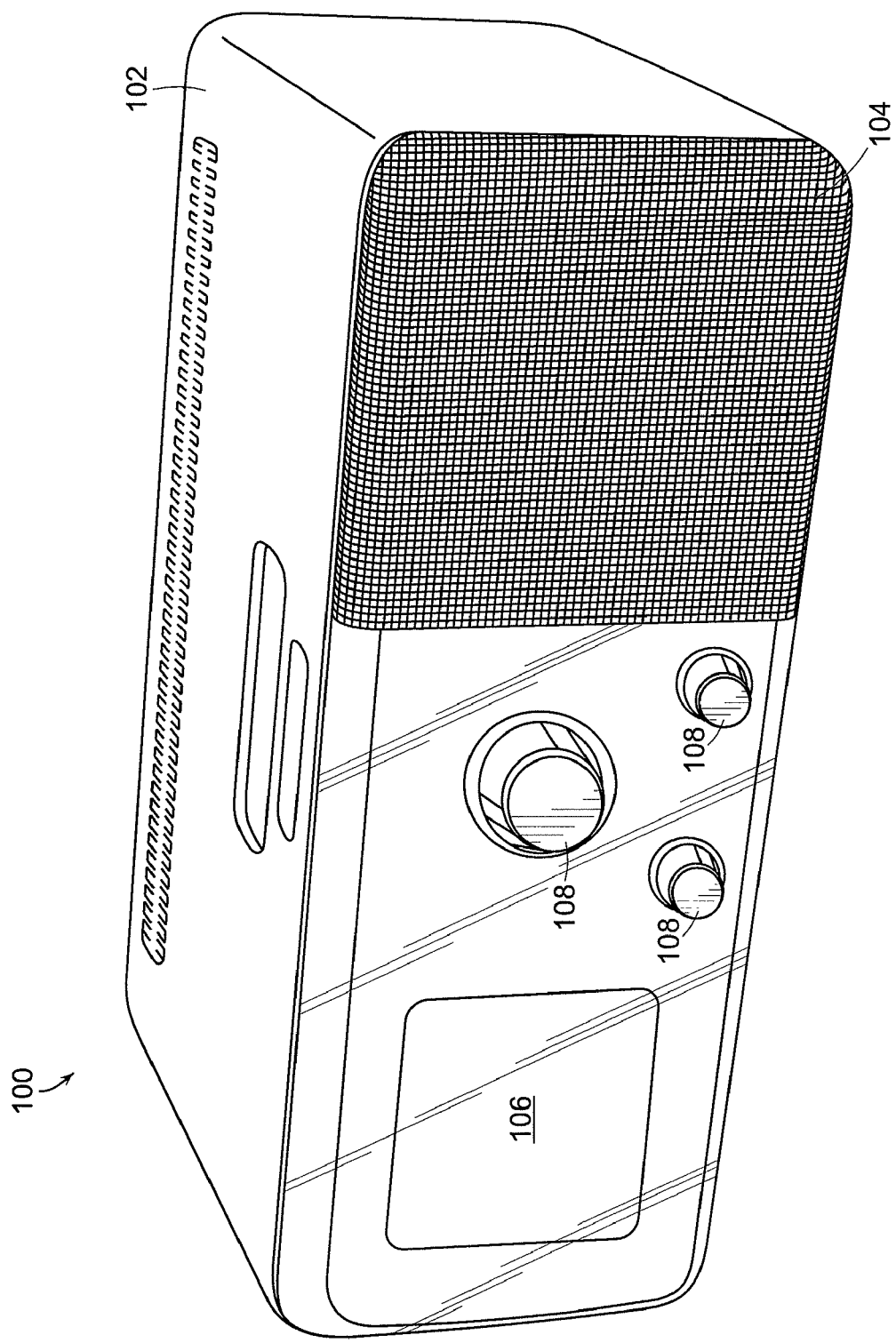
FIG. 1 is a diagram of an audio device according to aspects of the invention.

As discussed above, electronic devices can use the 50 Hz or 60 Hz input from the wall socket (from which they obtain operating power) as a frequency reference to generate an internal clock. Conventional devices are configured (e.g., by a user or vendor) to operate using either the 50 Hz or 60 Hz signal. Thus, if there is a change in the frequency, after the device has been configured, the device will no longer generate an accurate clock, and possibly not generate a clock at all. According to aspects and embodiments of the invention, there is provided a method and apparatus to detect and monitor the frequency of the AC input, to select between a number of possible frequencies (e.g., between 50 Hz and 60 Hz), and to automatically adjust the clock circuitry based on the detected frequency. Thus, a robust clock generating circuit is provided that may adapt to changing conditions, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one embodiment, a clock generating, or clock reference apparatus may be used in a table-top audio device. However, it is to be appreciated that although the following description of the clock generating (or clock reference) apparatus may refer to implementation in an audio device, the invention is not limited to use in audio devices and may be used with any electronic device that receives power from a wall outlet.

Referring to FIG. 1, there is illustrated one example of a table top audio device according to aspects of the invention. In one embodiment, the audio device has a width of 10.5 inches, a depth of 6.5 inches, and a height of 4 inches, and produces about 100 watts RMS of available output power. The audio device 100 includes a housing 102 inside which the power supply, amplifier, audio circuitry, radio receiving circuitry, etc. are contained. The audio device 100 comprises a speaker 104 and a display 106 that allows a user to see information such as, for example, the time and/or information about the audio being played (e.g., a radio station to which the device is tuned, the name of a song playing, etc.). A port (not shown) allows auxiliary devices (e.g., a computer or MP3 player) to be connected to the audio device and to supply an audio input to the audio device. The audio device 100 also comprises control knobs 108 that allow the user to adjust the volume of the audio and to alter aspects of the audio, for example, to tune the device to a particular radio station or to adjust the tone (bass/treble) of the sound, or to select a different audio mode (e.g., to change the device from playing received radio to playing audio from a CD or an attached MP3 player).

Figure 2:
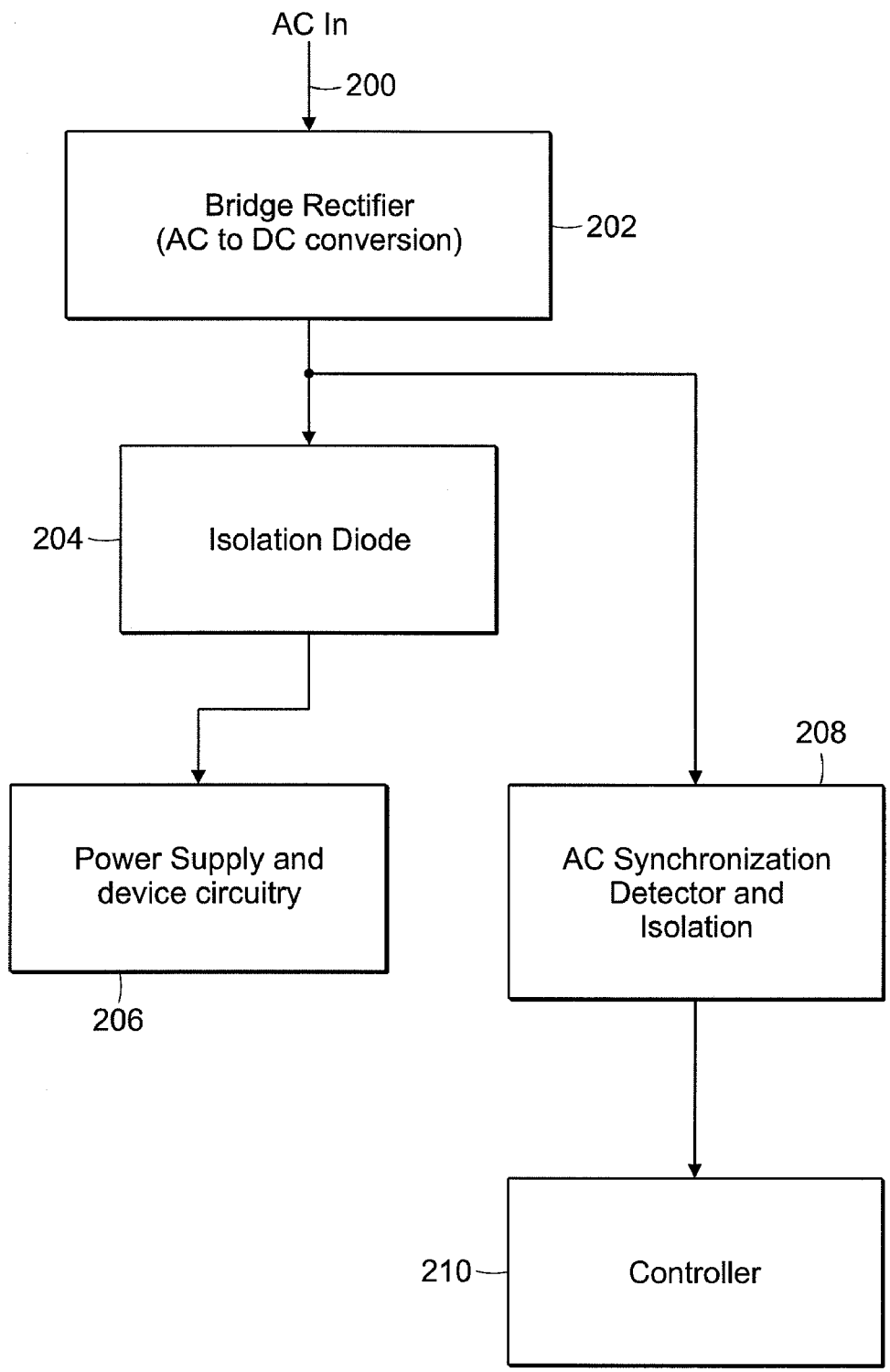
FIG. 2 is a block diagram of an apparatus to use the wall power as a reference clock for the audio device, according to aspects of the invention.

Referring to FIG. 2, there is illustrated a block diagram of an apparatus for using the wall power signal to generate a clock. It is to be appreciated that although the following discussion will refer primarily to generating a clock for an electronic device, the principles and apparatus discussed herein may also be used to monitor the accuracy of a clock generated by another means (e.g., a crystal). The clock generating apparatus may include hardware (e.g., a real-time clock chip) and/or software. Thus, it is to be appreciated that various aspects discussed in terms of hardware implementation may alternatively be implemented in software, and/or various aspects discussed in terms of software implementation may alternatively be implemented in hardware, as will be recognized by those skilled in the art given the benefit of this disclosure.

According to one embodiment, the AC input signal (represented by line 200) is input to a bridge rectifier 202 that rectifies the AC signal to provide a rectified signal. In one example, the bridge rectifier 202 is a full wave rectifier. From the bridge rectifier 202, the rectified signal is provided to a synchronization detector 208 where it is used to generate the clock, and also to the rest of the device circuitry 206, including the device power supply. In one example, the rectified signal is used as the time base for the clock. An isolation diode 204 is connected between the power supply 206 and the bridge rectifier 202 to prevent the filter capacitors from attenuating the time-varying signal that is used as the clock reference.

According to one embodiment, the synchronization detector 208 and controller 210 detect the frequency of the AC input signal, and the controller adjusts the clock generating apparatus based on the detected frequency. In one example, the controller 210 is a microprocessor that may also perform other control functions for the audio device 100 (or other electronic device). According to one embodiment, the controller increments its time based on the AC input signal to keep accurate track of the time of day. In one example, when power to the device fails, a low power 32 KHz oscillator is used to maintain the time during the power outage. The controller may be programmed such that if the power is not restored within a predetermined time period (e.g., a few hours or a day), then the device is powered down to preserve the internal battery. This may occur, for example, during shipment/storage of the device or during an extended power failure. The power down will cause the device to lose the time of day; however, when power is restored, the device may automatically regenerate its clock based on the AC input signal received from the wall power, as discussed above and below. The synchronization detector 208 may also include isolation and/or surge protection circuitry (e.g., zener diodes, resistors, capacitors, etc.). The synchronization detector can thus both isolate and reference the AC input so as to provide accurate timing to the audio device electronics without risk to the low voltage "sensitive" electronic components of the device.

Due to the full wave rectification by the bridge rectifier 202, the detected frequency of the AC input signal is doubled. For example, for a 60 Hz wall power signal, the synchronization detector 208 detects a 120 Hz signal, and for a 50 Hz wall power signal the synchronization detector 208 detects a 100 Hz signal. In one example, the synchronization detector 208 automatically detects whether the AC input is a 50 Hz input or a 60 Hz input, thereby obviating the need for a user or vendor to configure the device for a particular input frequency. In one example, the controller automatically determines the frequency of the AC input signal by doing a gross measurement of the input frequency based on its own crystal or other type of oscillator. The accuracy of the controller internal oscillator is generally sufficient such that the controller can detect the difference between a 50 Hz AC input signal and a 60 Hz AC input signal or, in the case where the frequency is doubled due to rectification, the difference between a 100 Hz input signal and a 120 Hz input signal.

In one embodiment, the power supply 206 is a switching power supply that includes a transformer. The transformer isolates the "power ground" from a "signal ground" on the audio device circuit board. The AC input 200 is a two-wire input, one wire of which is typically coupled to facility ground at the utility input power panel. In one example, the AC input 200 for the audio device 100 utilizes a non-polarized power plug and it is therefore not predetermined which of the two wires will be connected to the facility ground when the audio device is plugged in. As discussed above, the audio device 100 comprises a port that allows an auxiliary device, such as a computer, to be connected to the device to supply an audio input. Some auxiliary devices (such as computers) are grounded devices. Therefore, when such a grounded auxiliary device is connected to the audio device 100, the connection can cause the signal ground of the audio device to become coupled to the wall power ground. As a result, due to the use of a full bridge rectifier in the audio device, the synchronization detector 208 may detect that the frequency of the input signal has been halved. Thus, instead of detecting a 120 Hz or 100 Hz signal, the synchronization detector 208 detects a 60 Hz or 50 Hz signal, respectively. As discussed above, this may be accomplished by performing a comparison between the frequency of the received input signal and the frequency of the controller's internal oscillator.

To overcome this potential problem the controller 210 may automatically adjust the clock generating apparatus based on the frequency detected by the synchronization detector 208. In addition, the controller 210 and the synchronization detector 208 may continually monitor the frequency of the AC input and automatically compensate for changes in the frequency that may occur as a result of an auxiliary device being connected (as discussed above) or the device being moved to a location with a different wall power frequency.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An electronic device comprising:
 a power input adapted to receive an AC power signal having a power frequency;
 clock generating apparatus including a rectifier coupled to the power input and configured to receive the AC power signal and to provide a rectified signal, and a synchronization detector configured to receive the rectified signal, to detect a frequency of the rectified signal and to generate a synchronization signal; and
 a controller coupled to the synchronization detector and configured to receive the synchronization signal, to automatically determine the power frequency based on the synchronization signal, and to control the clock generating apparatus to generate a clock signal derived from the power frequency.

2. The electronic device as claimed in claim 1, wherein the electronic device is an audio device.

3. The electronic device as claimed in claim 2, wherein the audio device is a table-top radio.

4. The electronic device as claimed in claim 1, wherein the power frequency is one of 50 Hz and 60 Hz.

5. The electronic device as claimed in claim 1, further comprising a power supply configured to receive the AC power signal.

6. The electronic device as claimed in claim 5, wherein the power supply is a switching power supply.

7. The electronic device as claimed in claim 1, wherein the synchronization detector comprises surge protection circuitry.

8. The electronic device as claimed in claim 1, wherein the power frequency is one of two values; and wherein synchronization detector is configured to automatically detect a correct one of the two values of the power frequency.

9. An electronic device comprising:
 a power input configured to receive an AC power signal having a power frequency;
 clock generating apparatus including a rectifier coupled to the power input and configured to receive the AC power signal and to provide a rectified signal, and a synchronization detector configured to receive the rectified signal, to detect a frequency of the rectified signal and to generate a synchronization signal;
 a controller coupled to the synchronization detector and configured to receive the synchronization signal, to automatically determine the power frequency based on the synchronization signal, and to control the clock generating apparatus to generate a clock signal derived from the power frequency;

a power supply configured to receive the AC power signal; and an isolation diode coupled between the rectifier and the power supply.

10. The electronic device as claimed in claim 9, wherein the power supply is a switching power supply.

11. The electronic device as claimed in claim 9, wherein the electronic device is an audio device.

12. The electronic device as claimed in claim 11, wherein the audio device is a table-top radio.

13. The electronic device as claimed in claim 9, wherein the power frequency is one of 50 Hz and 60 Hz.

14. The electronic device as claimed in claim 9, wherein the power frequency is one of two values; and
wherein synchronization detector is configured to automatically detect a correct one of the two values of the power frequency.

15. A method of automatically generating a clock signal from an AC power line, the method comprising:

receiving an AC signal from the AC power line;
automatically detecting a frequency of the AC signal; and
generating the clock signal based on the detected frequency of the AC signal.

16. The method as claimed in claim 15, further comprising rectifying the AC signal to generate a rectified signal having a frequency double the frequency of the AC signal.

17. The method as claimed in claim 16, wherein automatically detecting the frequency of the AC signal includes automatically detecting the frequency of the AC signal based on the frequency of the rectified signal.

18. The method as claimed in claim 15, wherein automatically detecting the frequency of the AC signal includes automatically detecting whether the frequency of the AC signal is 50 Hz or 60 Hz.

19. The method as claimed in claim 15, further comprising monitoring the frequency of the AC signal to detect changes in the frequency of the AC signal.

20. The method as claimed in claim 19, further comprising automatically adjusting the clock signal responsive to detected changes in the frequency of the AC signal.

* * * * *